F. STADLER.
Sad-Iron Heater.
No. 99,609.          Patented Feb. 8, 1870.
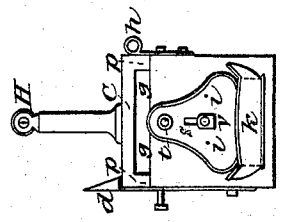
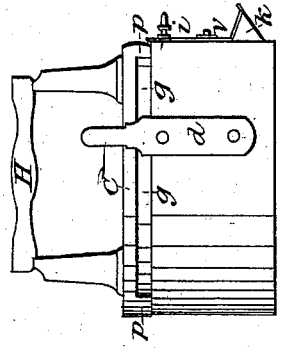
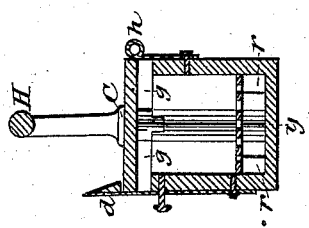
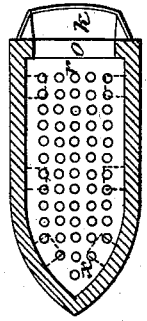
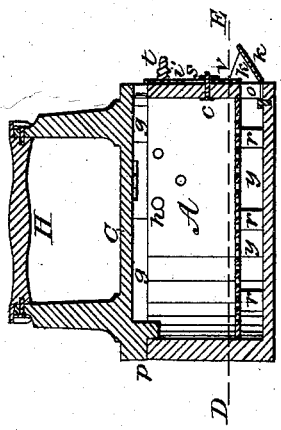
Witnesses:         Inventor:

United States Patent Office.

FERDINAND STADLER, OF PHILADELPHIA, PENNSYLVANIA.

Letters Patent No. 99,609, dated February 8, 1870.

SAD-IRON HEATER.

The Schedule referred to in these Letters Patent and making part of the same

*To all whom it may concern:*

Be it known that I, FERDINAND STADLER, of Philadelphia, in the county of Philadelphia, State of Pennsylvania, have invented a new and useful Improvement in Sad-Irons; and I do hereby declare that the following is a full and exact description thereof, reference being had to the annexed drawings, making part of this specification, in which—

Figure 1 is a longitudinal elevation.
Figure 2, a front elevation.
Figure 3, a transverse section.
Figure 4, a longitudinal section.
Figure 5, a horizontal section through the line D E, fig. 4.

The nature of my invention consists in providing sad-irons with a hollow heating-chamber, which, when charcoal or any other suitable kind of fuel is burned in it, serves to heat the sad-iron, and to keep up the right temperature of the same. By this contrivance, I am enabled to dispense with the expensive, and, in summer-time, very uncomfortable practice of heating the irons on the stove or range; and, besides, I can keep up the temperature of my sad-iron much more uniformly and with much less expense.

To enable others skilled in the art to make and use my invention, I will proceed to describe its construction and operation.

I have my sad-irons cast with a hollow chamber, A, open at the top.

A corresponding cast-iron lid or cover, C, to which the handle H is fastened in the usual way, and which is provided, on the inner side, with three projections, $p\ p\ p$, one at the forward end and two at the back, is attached to the body of the sad-iron, by means of the hinge $h$, on one side, and by the spring-catch $d$ on the other side.

On the bottom of the hollow heating-chamber A, I have a certain number (six) of projections, $r\ r\ r\ r\ r\ r$, which support a perforated iron plate, $x$, serving as a grate, and under this grate an open space, $y$, which is used as an ash-pit, and communicates with the outside by the opening $o$, which is surrounded by a fender, $k$, in order to prevent the falling out of the ashes from the ash-pit.

By the sliding door $i$, which can be moved up and down by means of the knob $t$ and the slot $s$, through which a screw, $c$, provided with a face-plate, $v$, projects, I am enabled to regulate the draught, and, consequently, the temperature of my sad-iron, and I can also stop the draught entirely. This latter is done when the iron is not in use, in order to keep up the heat and to save the fuel.

When I want to use my improved sad-iron, I have to open the lid C, by drawing back the spring-catch $d$, and after filling the hollow chamber A, above the grate $x$, with live charcoal or other suitable fuel, I close the lid again. After a few minutes, the sad-iron will then be ready for use. The draught passes in through the opening $o$ and the grate $x$, and sets the coals in a blaze. The products of combustion escape through the openings $g\ g\ g$, between the projections of the lid $p\ p\ p$, and the iron becomes sufficiently hot to use it for all purposes for which common sad-irons are now employed.

I know that self-heating sad-irons have been invented and used before, especially sad-irons heated by gas-jets. But for my invention, I claim that it is the cheapest—only seven cents' worth of charcoal is consumed per day—as well as the most convenient. The chimney through which the products of combustion have to escape, (as used by all former inventors of self-heating sad-irons,) is very inconvenient for the workman, because the concentrated heat escaping through it scorches his hand, and makes his head ache. My improved sad-iron, on the contrary, causes the heat to diffuse. It must, with the other products of combustion, escape through three different broad openings, and, consequently, does not molest the workman.

What I claim as my invention, and desire to secure by Letters Patent, is—

The sliding door $i$, constructed as specified, and the fender $k$, in combination with the openings $g\ g\ g$, the grate $x$, and the ash-pit $y$, substantially and for the purpose as set forth.

FERDINAND STADLER.

Witnesses:
HERMANN SPOCOKE,
JOHN BENTLEY.